(12) United States Patent
Westphal et al.

(10) Patent No.: US 6,468,454 B1
(45) Date of Patent: Oct. 22, 2002

(54) METHOD AND DEVICE FOR SHAPING THE SURFACE OF EXTRUDED PROFILES

(75) Inventors: Hans-Jürgen Westphal, Hof (DE); Michael Schöbel, Selb (DE); Thomas Heinl, Hof (DE); Hartmut Schinzel, Münchberg (DE); Klaus Dittmann, Rehau (DE)

(73) Assignee: Rehau & AG & Co. (DE)

( * ) Notice: Subject to any disclaimer, the term of this patent is extended or adjusted under 35 U.S.C. 154(b) by 0 days.

(21) Appl. No.: 09/509,685
(22) PCT Filed: Nov. 28, 1998
(86) PCT No.: PCT/EP98/07697
§ 371 (c)(1),
(2), (4) Date: Mar. 30, 2000
(87) PCT Pub. No.: WO99/28112
PCT Pub. Date: Jun. 10, 1999

(30) Foreign Application Priority Data

Nov. 28, 1997 (DE) ...................................... 297 21 105 U

(51) Int. Cl.[7] ........................ B29C 43/22; B29C 59/104
(52) U.S. Cl. ...................... 264/157; 264/280; 264/284; 425/363; 425/385
(58) Field of Search ................................ 264/157, 159, 264/280, 284; 425/363, 385

(56) References Cited

U.S. PATENT DOCUMENTS

| 2,075,735 A | * | 3/1937 | Loomis | ..................... 264/175 |
| 5,024,799 A | | 6/1991 | Harp | |
| 5,310,333 A | | 5/1994 | Sato | |

FOREIGN PATENT DOCUMENTS

| EP | 0092745 A1 | * | 11/1983 |
| WO | 88/00883 | | 2/1988 |

* cited by examiner

Primary Examiner—Leo B. Tentoni
(74) Attorney, Agent, or Firm—Venable; Robert Kinberg

(57) ABSTRACT

The invention relates to a method for shaping the surface of extruded profiles made of thermoplastic materials with a device which is profiled to the shaping surface such that it is complimentary to the demanded shaping dimensions and presses into the continuous profile. The invention provides a method and device with whose simple, economic and high uniformity permit a material-saving production of profiles while completely adhering to the required stability at the same time. To this end, the shaping device presses the desired shaping dimensions into the continuous profile such that the wall strength of the surrounding edges of the impressions is reduced and work-hardened. The profiles are cooled and shaped into a dimensionally stable state in such a way that the height of the impressions at least correspond to the halved wall strengths of the continuous profile.

32 Claims, 4 Drawing Sheets

METHOD AND DEVICE FOR SHAPING THE SURFACE OF EXTRUDED PROFILES

BACKGROUND OF THE INVENTION

1. Field of the Invention

The invention relates to a method for shaping the surface of extruded profiles made of thermoplastic materials with a device, which is profiled to the shaping of the surface such that it is complimentary to the required shaping dimensions and presses these into the continuous profile.

2. Description of the Related Art

A device of this type is described in U.S. Pat. No. 2,075,735 which is designed according to a shaping apparatus. With this imprinting apparatus, the imprinting elements are arranged continuously on a conveying belt in a creeper chain manner whereby these elements are arranged on both sides of the just produced imprinting profile and impinge on the latter. Hereby, the imprinting surface is still warmed by the original shaping method and can be heated if necessary. The shaping dimensions are formed complimentary in the imprinting apparatus and are pressed into the continuous profile.

This device is very costly in its construction and therefore very expensive and prone to failure. A further disadvantage of this device is that it can only be used for each respective continuous profile. If a profile needs to change, removal is time—and cost-consuming, and a new device for the respective profile has to be mounted.

A further device of this type is described in EP 0 092 745.

This relates to a device for imprinting the surface of thermoplastic materials immediately after its shaping process in a warm-plastic state. The used imprinting tool is profiled complimentary at its peripheral surface to the desired imprinting dimensions and presses these into the passing profile material.

Thereby, a negative pressure arrangement in the area of the imprinting tool, which is formed as a roller, sucks the profile material against the unwinding peripheral roller surface. The imprinting roller proceeds with part of its circumference through an opening of the low-pressure chamber and is arranged at the front of a calibrating nozzle.

The roller runs in the manner of a rolling seal over the imprinting and still workable surface of the profile material, whereby, by means of the sucking effect which pulls the profile material against the imprinting roller, its surface is provided with the required profiling corresponding to the outer profile of the printing roller in a fine, clear manner without leaving undesired shaping traces. The obtained sucking effect is sufficient to pull the surface of the profiling material against the imprinting roller so that a clean imprint is achieved but only a very small dynamic effect is derived that the dimensional accuracy of the profile material is not permanently impaired. A further advantage consists in that the imprinting process occurs after the extrusion when the profile material can still be shaped and undesired deformations can be prevented.

A disadvantage of this device, which is generally only used for hollow chamber profiles, is the cost of construction. Moreover, the shaping takes place in the warm-plastic area. After the shaping, the profile material cools down and due to the relaxation, the contours of the imprints fade with time. A further disadvantage is that the method for imprinting the surface of the profile material takes place by applying a vacuum. For this process quite extensive devices are necessary whereby the control and timing of the imprinting method become very difficult. The imprinting rollers used have the same width as the continuous profiles and can lead to damage and deformation in the marginal areas of the continuous profiles.

A further disadvantage of this method is that the device used for this imprinting process partially penetrates the surface of the continuous profile materials causing damage to these materials. Further, an indentation results from the shaping dimensions within the profile material and thereby initiates potential ruptures.

SUMMARY OF THE INVENTION

The object of the present invention is to improve the known state of the art technology in such a manner that a method and a device are provided which simply, economically and with high accuracy indicate a material-saving manufacturing of profiles with a full retention of the required stability at the same time.

This is achieved with the embodiment according to the characterizing features of the present invention. The shaping profile is cooled down in a first processing step and supplied to the shaping device in a dimensionally stable state. In the second processing step, the shaping device presses the desired shaping dimensions into the continuous profile so that the surrounding edges of the impressions are reduced in their wall strength and thereby work-hardened. In a third process step, the imprinted profiles are cut down and deposited into defined units.

In a further advantageous embodiment of the method according to the invention, the shaping C- or U-profile is cooled down in a first processing step and supplied to the shaping device in a dimensionally stable state. In a second processing step, the side walls of the C- and U-shaped profiles are fastened and in the third processing step, the desired shaping dimensions are pressed by means of the shaping device into the continuous C- or U-shaped profile. The surrounding edges of the impressions are thereby reduced in their wall strength and work-hardened. In a fourth processing step, the side walls of the C- or U-shaped profile are retained in their fastened state and in a fifth processing step returned to their initial state. In a sixth processing step, the imprinted C- or U-shaped profiles are cut down and deposited into defined units.

The advantage of this method is that profiles are manufactured in a simple and cost-effective manner for which a lower material expenditure is possible with the same mechanical characteristics. The manufacturing of these profiles is more effective since the cooling periods and therefore the entire manufacturing time can be reduced by the reduced wall strengths.

A further advantage of this method is that it can be applied nearly independently from the used profiling dimensions whereby only the desired shaping dimensions define the required shaping device.

A further important advantage of the shaping device is that the profiles are cooled down and can be shaped in a dimensionally stable state in such a manner that the height of the impressions corresponds at least to half the wall strength of the continuous profile.

In an advantageous embodiment, the shaping device is an opposed rotating imprinting tool comprising at least one stamping roller and at least one matrix ring.

The gap, i.e., the distance between the highest point of the stamping roller and the highest point of the matrix ring, corresponds at least to the wall strength of the continuous profile.

Advantageously, the distance between the highest and the lowest point of the stamping roller corresponds in the area of the impression at least to half the wall strength of the continuous profile. Thereby, the surrounding edges of the impressions are reduced in their wall strength, work-hardened and lead to a particular stabilisation of the continuous profile. The distance between the highest and the lowest point of the matrix ring also corresponds at least to half the wall strength of the continuous profile so that this reduction in wall strength and the resulting consolidation of the profile material is obtained.

In a further advantageous embodiment of the device according to the invention, one or several stamping rollers and one or several corresponding matrix rings are integrated in the arrangement.

These can be arranged without a drive and freely rotatable so that the speed of the opposed imprinting tools is defined by the discharge speed in the extrusion section.

In a further advantageous embodiments the stamping rollers and matrix rings have common drive units, and their speeds are approximately equal to the discharge speed of the continuous profile in the extrusion section.

In a further embodiment, the shaping device comprises at least one stamping tool of a defined length with at least one complimentary abutment. This embodiment can be formed in such a manner that the stamping tool with the complimentary abutment in axial direction, that is in the direction of extrusion, is arranged movably and carries out intermittent movements. Thereby, the shaping process can be carried out in a cost-effective manner in the extrusion section as the shaping tool moves at the same rate as the continuous profile.

In a further embodiment according to the invention, the shaping tools is designed in such a manner that the stamping tool and the complimentary abutment can carry out a movement perpendicular to the direction of extrusion.

This is, for example, of advantage at relatively low extrusion speeds whereby the shaping profile piece is clamped and the desired shaping dimensions are applied while the continuous profile is stocked up in the extrusion section.

Hereby, the costs for the shaping tool can be kept at a low level which has a positive effect on the price of the finished product.

With this embodiment too, the distance between the highest point of the stamping tool and the highest point of the complementary abutment is carried out at least with the wall strength of the continuous profile. A further advantage in this embodiment is that the distance between the highest point and the lowest point of the stamping tool in the area of the impressions is designed at least with half the wall strength of the continuous profile. The distance between the highest and the lowest point of the complimentary abutment is advantageously designed in the area of the impression at least with half the wall strength of the continuous profile.

Thereby it is achieved that the hardening in the surrounding edge region of the impressions is obtained and a profile is produced which has a lower initial wall strength and the same mechanical stability as commonly manufactured profiles according to the state of the art technology.

EMBODIMENT EXAMPLES

A number of embodiments of shaped profiles are explained in detail by means of schematic drawings.

DESCRIPTION OF THE PREFERRED EMBODIMENTS

Figure 1:
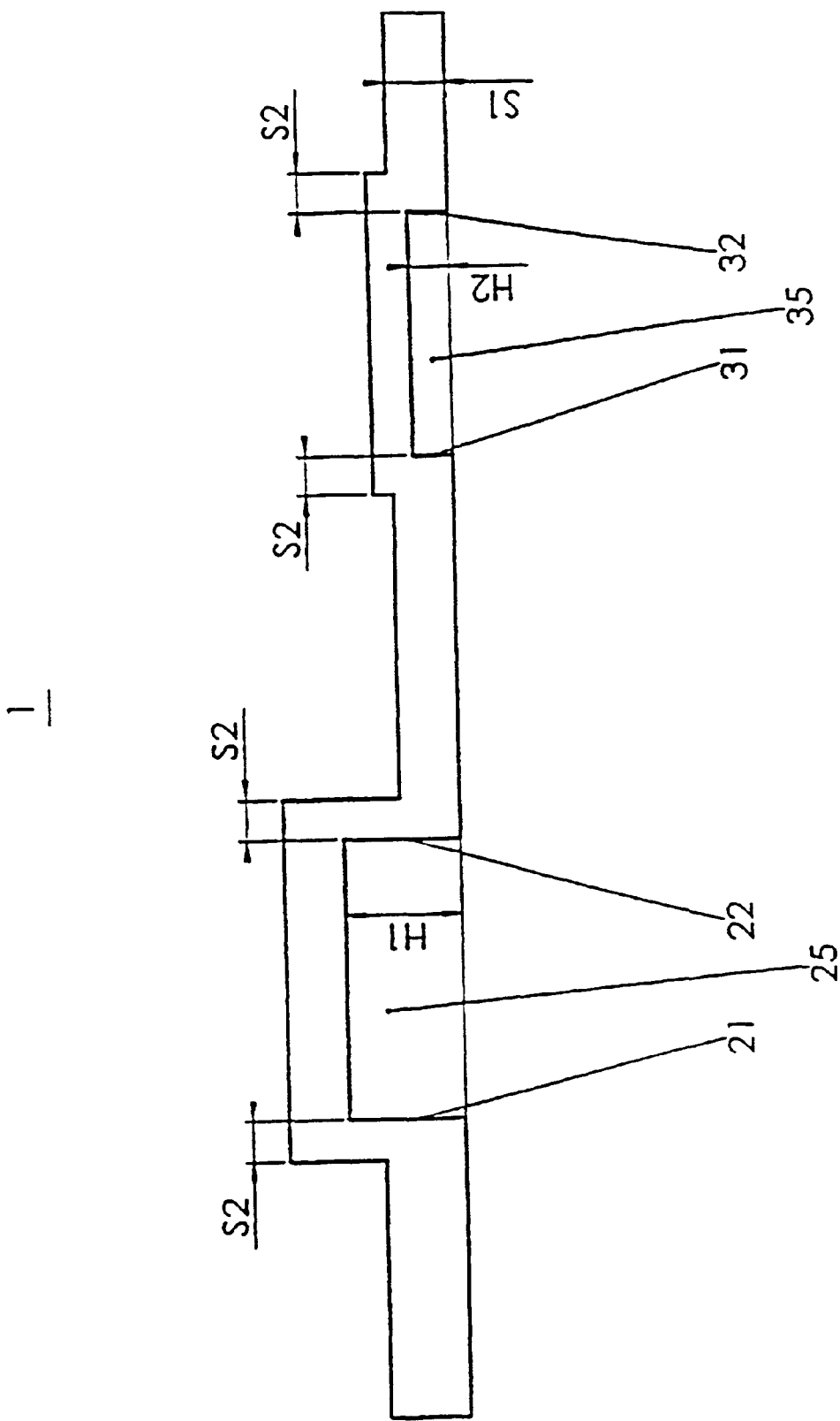
FIG. 1 shows a sectional illustration across a tape-shaped profile.

In FIG. 1 a tape-shaped profile 1 with the base wall strength S1 is illustrated. In this profile, adjacent impressions 25 and 35 are provided with the heights H1 and H2 respectively.

The height H1 corresponds in this embodiment approximately to one and a half times the base wall strength S1 while the height H2 corresponds to half the base wall strength S1.

The reduced wall strength S2 which has been obtained by means of work-hardening can be seen in the edge regions 21, 22 of the impression 25 and the edge regions 31, 32 of the impression 35.

Figure 2:
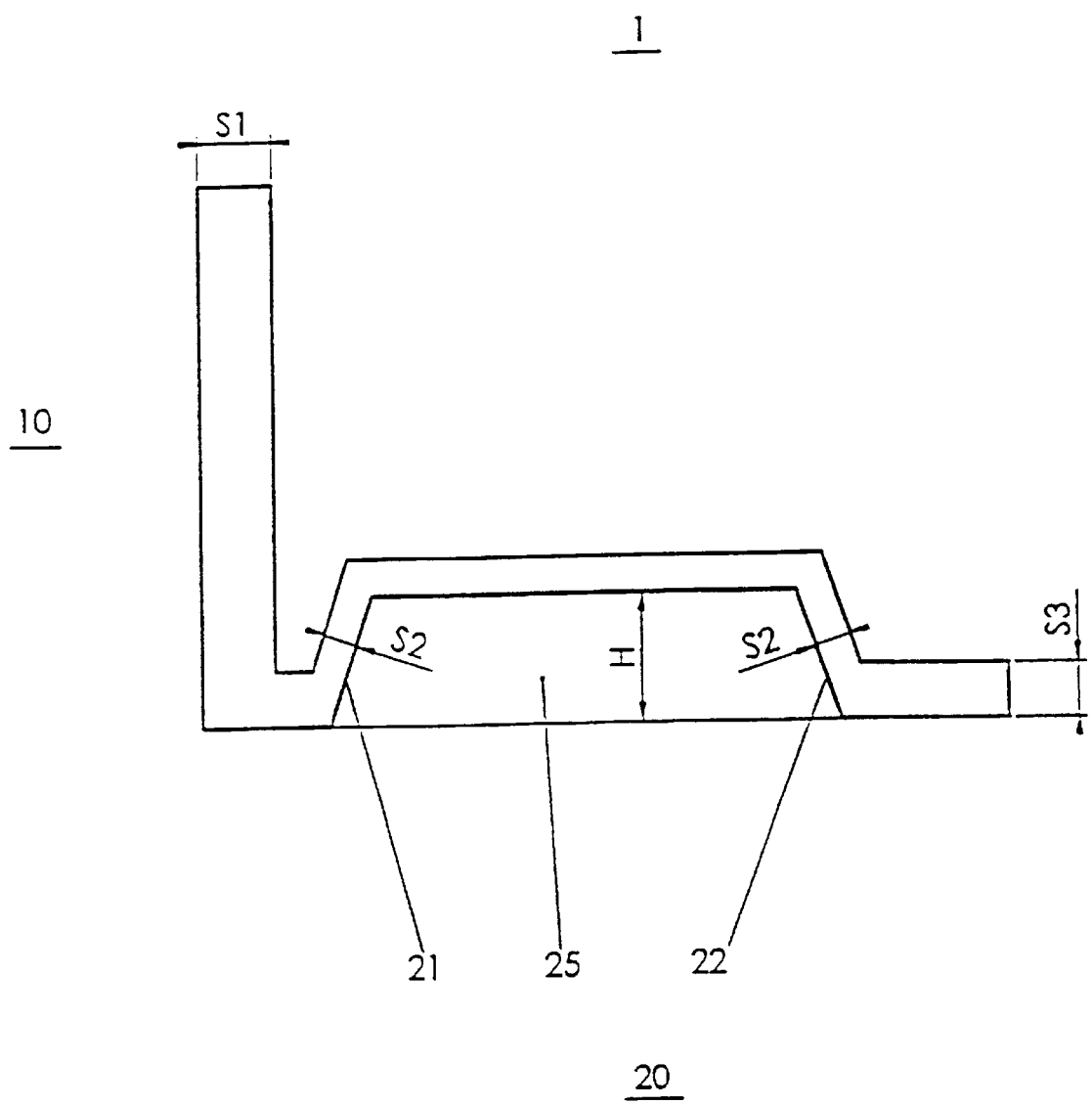
FIG. 2 shows a sectional illustration across an L-shaped profile.

In FIG. 2, the L-shaped profile 1 with the base wall strength S1 of the perpendicular leg 10 is illustrated. The horizontal leg 20 is designed in the reduced wall strength S3 since by means of the impression 25 with the height H, in this case corresponding to double the base wall strength S1, the same stability and firmness is achieved with the reduced wall strength S3. The reduced wall strength S2 which has been obtained by means of material work-hardening can be seen in the edge region 21, 22 of the impression 25.

Figure 3:
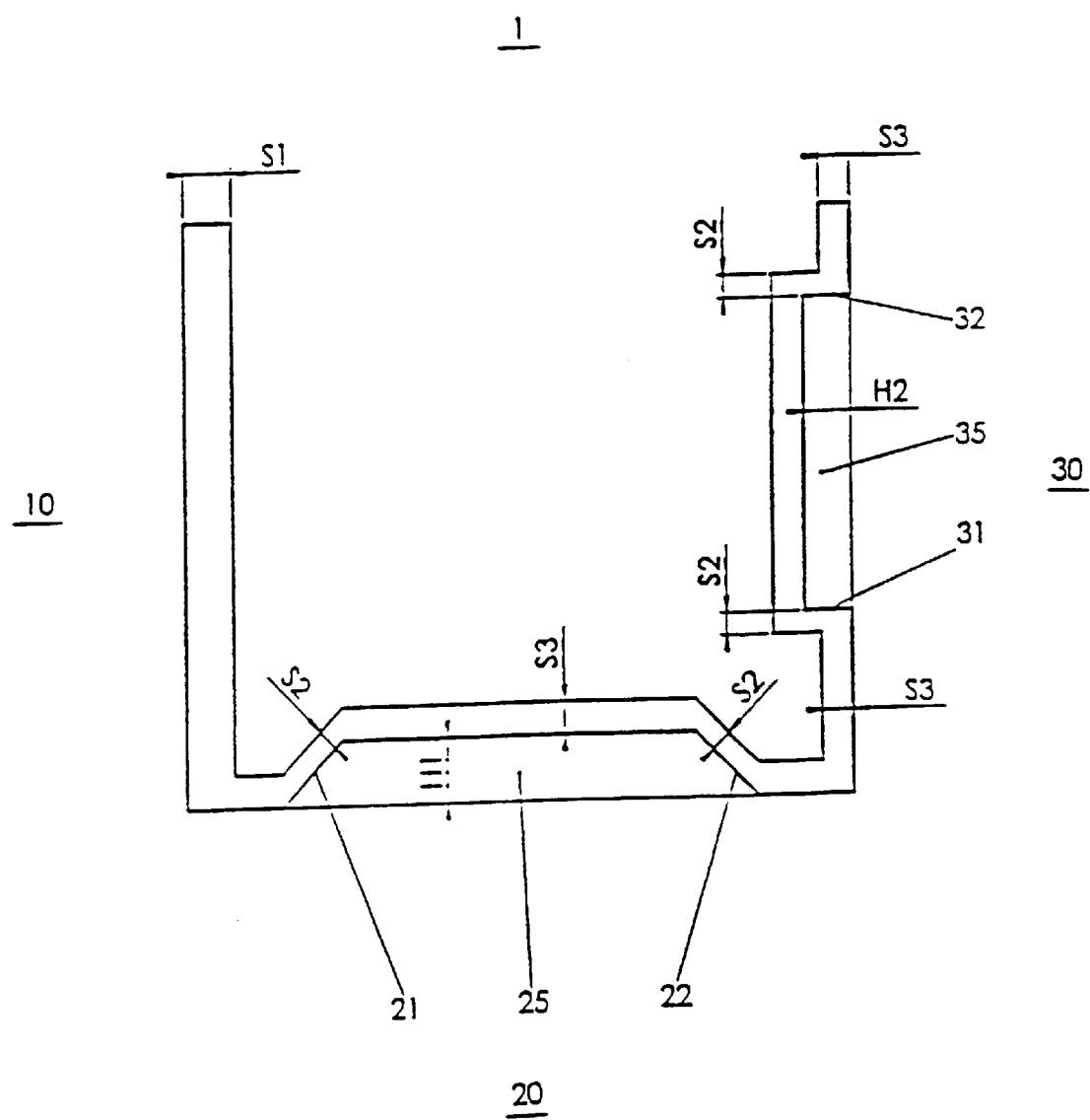
FIG. 3 shows a sectional illustration across a U-shaped profile.

The U-shaped profile 1 in FIG. 3 was subject to a double shaping. The base wall strength S1 of the profile 1 which is realised in the leg 10 could be reduced to the wall strength S3 in the shaping area. The height H1 of the impression 25 in the base part 20 of the profile 1 corresponds approximately to the base wall strength S1 of the perpendicular leg 10 of the profile 1. In the edge region 21, 22 of the impression 25, the reduced wall strength S2 obtained by means of work-hardening can be seen. In the right leg 30 of the profile 1 an impression 35 with a height H2 is shown which approximately corresponds to the base wall strength S1 of the leg 10 of the profile 1. The base wall strength S3 in the leg 30 of the profile 1 corresponds to the wall strength of the base part 20 of the profile 1. In the edge region 31, 32 of the impression 35, the reduced wall strength S2 obtained by means of work-hardening can be seen.

Figure 4:
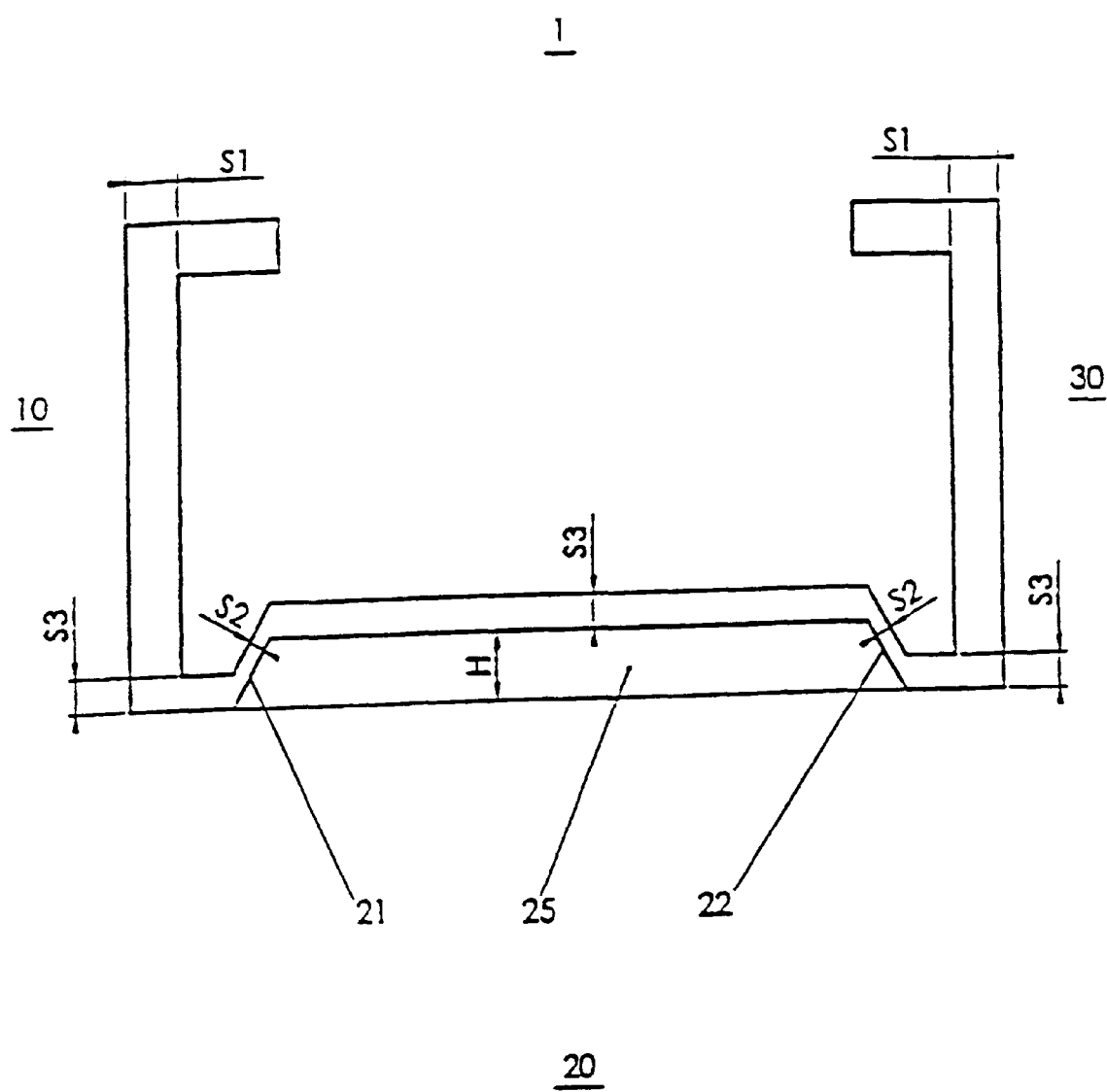
FIG. 4 shows a sectional illustration across a C-shaped profile.

In FIG. 4 a C-shaped profile 1 is illustrated whereby the left leg 10 and the right leg 30 are designed in the base wall strength S1. An impression 25 is located in the area of the base part 20 with a height H which corresponds approximately to one and a half times the base wall strength S1 of the left leg 10 and the right leg 30.

The wall strength S3 of the base part 20 is reduced relative to the base wall strength S1 of the profile 1. In the edge region 21, 22 of the impression 25, the reduced wall strength S2 obtained by means of work-hardening can be seen.

What is claimed is:

1. A method for shaping the surface of a C-shaped or U-shaped extruded profile having side walls and made of thermoplastic materials with a shaping device which is profiled complimentary to the required shaping dimensions, comprising:

cooling the extruded profile;

supplying the rigid extruded profile to the shaping device;

forcing apart the side walls;

pressing the extruded profile into the desired shaping dimensions with the shaping device to provide a continuous C-shaped or U-shaped profile such that the surrounding edges of impressions reduce side wall thickness of the C-shaped or U-shaped profile;

solidifying the C-shaped or U-shaped profile by cooling;

holding apart the C-shaped or U-shaped profile by cooling;

returning the C-shaped or U-shaped profile with reduced side wall thickness to the position before the side walls were initially forced apart; and cutting and depositing the C-shaped or U-shaped profiles into defined units.

2. The method for shaping the surface of C-shaped or U-shaped extruded profile as in claim 1, wherein the profiles are shaped such that the depth of the impressions correspond to at least half of the wall thickness of the profile.

3. The method for shaping the surface of C-shaped or U-shaped extruded profile as in claim 1, wherein the shaping device comprises a guide for the profiles and a shaping tool which is profiled to the shaping of the surface such that it is complimentary to the required shaping dimensions and presses into the continuous profile, and wherein the impressions have a height corresponding to at least half the wall thickness of the continuous profile.

4. The method for shaping the surface of C-shaped or U-shaped extruded profile as in claim 3, wherein the shaping tool is an opposed rotating imprinting tool comprising at least one stamping roller and at least one matrix ring.

5. The method for shaping the surface of C-shaped or U-shaped extruded profile as in claim 4, wherein the distance between the highest point of the stamping roller and the highest point of the matrix ring corresponds at least to the wall thickness of the continuous profile.

6. The method for shaping the surface of C-shaped or U-shaped extruded profile as in claim 4, wherein the distance between the highest and the lowest point of the stamping roller corresponds in the area of the impression at least to half the wall thickness of the continuous profile.

7. The method for shaping the surface of C-shaped or U-shaped extruded profile as in claim 4, wherein the distance between the highest and lowest point of the matrix ring corresponds at least to half the wall thickness of the continuous profile.

8. The method for shaping the surface of C-shaped or U-shaped extruded profile as in claim 3, wherein the stamping roller and the matrix ring are arranged without a drive and freely rotatable.

9. The method for shaping the surface of C-shaped or U-shaped extruded profile as in claim 4, wherein one or several stamping rollers and one or several matrix rings are provided with a common drive unit.

10. The method for shaping the surface of C-shaped or U-shaped extruded profile as in claim 4, wherein the speed of the opposed rotating imprinting tool is approximately equal to the discharge speed of the continuous profile.

11. The method for shaping the surface of C-shaped or U-shaped extruded profile as in claim 3, wherein the shaping device comprises at least one stamping tool of a defined length with at least one complimentary abutment.

12. The method for shaping the surface of C-shaped or U-shaped extruded profile as in claim 11, wherein the stamping tool and the complimentary abutment are arranged movably in the axial direction and carry out intermittent movement.

13. The method for shaping the surface of C-shaped or U-shaped extruded profile as in claim 11, wherein the stamping tool and the complimentary abutment carry out a movement perpendicular to direction of extrusion.

14. The method for shaping the surface of C-shaped or U-shaped extruded profile as in claim 11, wherein the distance between the highest point of the stamping tool and the highest point of the complimentary abutment corresponds at least to the wall thickness of the continuous profile.

15. The method for shaping the surface of C-shaped or U-shaped extruded profile as in claim 11, wherein the distance between the highest and the lowest point of the stamping tool in the area of the impression corresponds at least to half the wall thickness of the continuous profile.

16. The method for shaping the surface of C-shaped or U-shaped extruded profile as in claim 11, wherein the distance between the highest and the lowest point of the complimentary abutment in the area of the impression corresponds at least to half the wall thickness of the continuous profile.

17. A method for shaping an extruded profile made of a thermoplastic material with a molding device with a complimentary profile at its shaping surface to the desired molded geometry, comprising the steps of:

cooling the extruded profile, which has a C-shape or a U-shape and which has side walls having a thickness;

feeding the cooled extruded profile to the molding device in a rigid state;

forcing apart the side walls of the C-shaped or U-shaped extruded profile;

imposing the desired molded geometry upon the C-shaped or U-shaped profile to form impressions having peripheral edges, wherein the peripheral edges have a reduced wall thickness;

forcing apart the side walls of the C-shaped or U-shaped extruded profiles;

returning the side walls to original condition; and cutting the molded profiles to defined lengths.

18. The method of claim 17, wherein the profiles are shaped such that the depth of the impressions correspond to at least half of the wall thickness of the profile.

19. A device for shaping the extruded profiles made according to the method of claim 17, including: a molding die with a profile complementary to the required molding geometry at its molding surface; a guide for the C or U-shaped profile; a separator forcing apart side walls of the C or U-shaped profile; a holder holding the side walls in a separated condition; and means for returning the side walls to their original state.

20. A device for shaping the extruded profiles made according to the method of claim 19, wherein: the molding die is a counterrotating, embossing die which comprises at least one stamping roller and at least one die ring.

21. A device for shaping the extruded profiles as in claim 19, wherein: the distance between the highest point of the stamping ring and the highest point of the die ring represents at least the wall thickness of the profile.

22. A device for shaping the extruded profiles made according to the method of claim 19, wherein: the distance between the highest and lowest points of the stamping roller represents at least half of the wall thickness of the profile.

23. A device for shaping the extruded profiles made according to the method of claim 19, wherein: the distance between the highest and lowest points of the die ring represents at least half of the wall thickness of the profile.

24. A device for shaping the extruded profiles made according to the method of claim 19, wherein: the stamping roller and the die ring are not driven and rotate freely in bearings.

25. A device for shaping the extruded profiles made according to the method of claim 19, wherein: one or more stamping rings and one or more die rings are equipped with a common drive unit.

26. A device for shaping the extruded profiles made according to the method of claim 19, wherein: the speed of the counterrotating embossing die is approximately equal to the drawing speed of the profile in an extrusion line.

27. A device for shaping the extruded profiles made according to the method of claim 19, wherein: the molding die comprises at least one stamping die with at least one complementary thrust block.

28. A device for shaping the extruded profiles made according to the method of claim 27, wherein: the stamping die and the complementary thrust block are moveable in an axial direction and execute intermittent movements.

29. A device for shaping the extruded profiles made according to the method of claim 27, wherein: the stamping die and the complementary thrust block execute a movement vertically to the direction of extrusion.

30. A device for shaping the extruded profiles made according to the method of claim 27, wherein: the distance between the highest point of the stamping die and the highest point of the complementary thrust block represents at least the wall thickness of the profile.

31. A device for shaping the extruded profiles made according to the method of claim 27, wherein: the distance between the highest and lowest points of the stamping die at the impressed area represents at least half of the wall thickness of the profile.

32. A device for shaping the extruded profiles made according to the method of claim 27, wherein: the distance between the highest and lowest points of the complementary thrust block at the impressing area represents at least half of the wall thickness of the profile.

* * * * *